United States Patent
Griffin et al.

(10) Patent No.: US 7,388,576 B2
(45) Date of Patent: Jun. 17, 2008

(54) HANDHELD ELECTRONIC DEVICE AND KEYPAD PROVIDING ENHANCED USABILITY AND REDUCED SIZE, AND ASSOCIATED METHOD

(75) Inventors: Jason T. Griffin, Waterloo (CA); Steven Henry Fyke, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 667 days.

(21) Appl. No.: 11/063,682

(22) Filed: Feb. 23, 2005

(65) Prior Publication Data

US 2006/0187210 A1    Aug. 24, 2006

(51) Int. Cl.
*G09G 5/00* (2006.01)

(52) U.S. Cl. ............... 345/168; 345/169; 345/172

(58) Field of Classification Search ......... 345/156–172
See application file for complete search history.

(56) References Cited

U.S. PATENT DOCUMENTS

| | | | |
|---|---|---|---|
| 6,204,848 B1 * | 3/2001 | Nowlan et al. | 715/810 |
| 6,377,685 B1 | 4/2002 | Krishnan et al. | |
| 7,312,410 B2 * | 12/2007 | Griffin et al. | 200/5 A |
| 2003/0012368 A1 | 1/2003 | Smallwood | |

FOREIGN PATENT DOCUMENTS

| | | |
|---|---|---|
| DE | 36 07 689 A1 | 9/1987 |
| WO | WO 99/44212 A | 9/1999 |

* cited by examiner

*Primary Examiner*—Vijay Shankar
(74) *Attorney, Agent, or Firm*—Brij K. Agarwal; Eckert Seamans Cherin & Mellott, LLC

(57) ABSTRACT

An improved handheld electronic device, keypad, and method in accordance with the invention meet these and other needs. An improved handheld electronic device having an improved keypad provides enhanced usability and reduced size by organizing its keys in pairs, with a pair of keys being disposed on a support. Each key of a pair of keys is individually actuatable. An actuation of a key causes a primary conductor associated with the key set to electrically to connect a pair of contacts and to cause a secondary conductor associated with the key to electrically connect another pair of contacts. The primary conductor is a dome that is collapsible to electrically connect the pair of contacts and to provide a particular tactile feedback to the user. The secondary conductor is a conductor other than a collapsible dome. An actuation of any key or of any pair of keys thus provides to the user a consistent tactile feedback from a collapse of a single dome. An improved method in accordance with the invention is also disclosed.

23 Claims, 7 Drawing Sheets

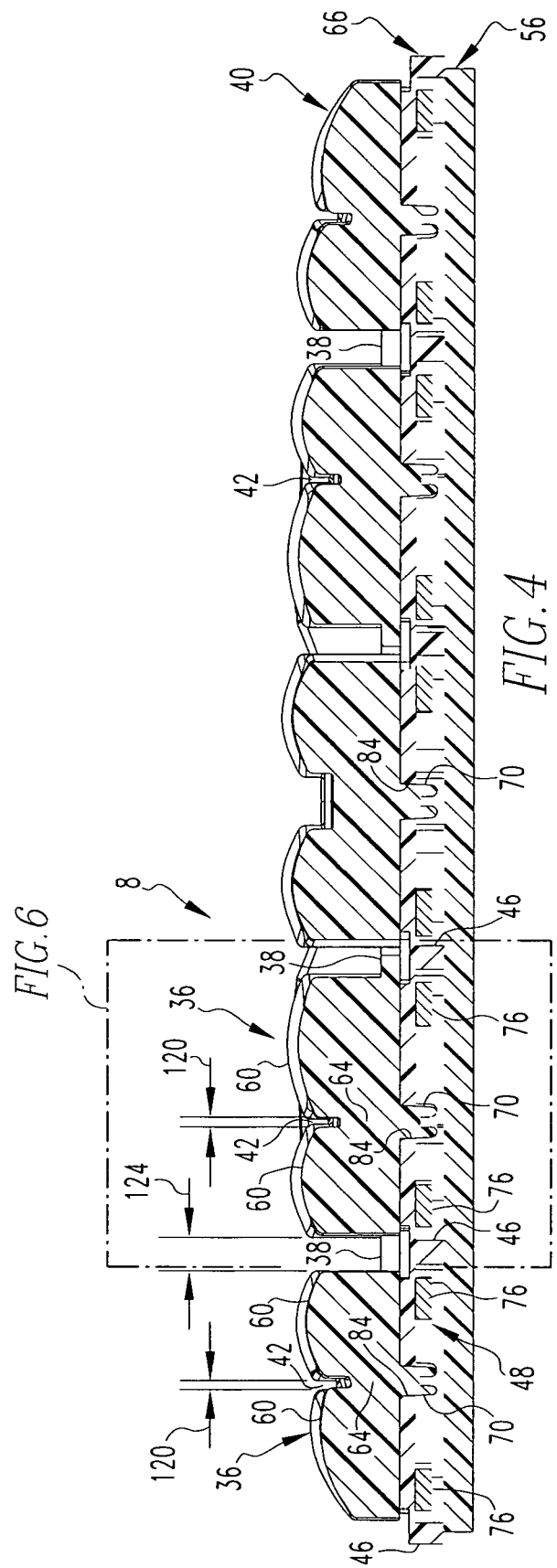

HANDHELD ELECTRONIC DEVICE AND KEYPAD PROVIDING ENHANCED USABILITY AND REDUCED SIZE, AND ASSOCIATED METHOD

BACKGROUND OF THE INVENTION

1. Field of the Invention

The invention relates generally to handheld electronic devices and, more particularly, to a keypad for a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus must be relatively small. Many handheld electronic devices feature wireless communication capability, although many such handheld electronic devices are stand-alone devices. Since handheld electronic devices typically are portable, it is also desired that the form factor of the devices be sufficiently small and ergonomic that they can conveniently be transported with a belt clip, in a user's pocket, manually, or in a briefcase. Advancements in technology have permitted the form factor of such handheld electronic devices to be reduced while increasing their versatility and functionality, such as by increasing the number of functions provided by the device as well as increasing the number of software applications and the variety of their features. However, as the form factor of a handheld electronic device decreases and the number of functions provided by the device increases, the device potentially can become awkward and difficult to use. Thus, it is also desirable to improve the usability of a handheld electronic device as its form factor is reduced and its versatility is increased. Previous attempts to increase such usability have had limitations.

One such type of solution has involved the use of large numbers of keys which, when pressed in various combinations, would produce various functions. For instance, adjacent keys were depressed simultaneously to provide additional functions. In mobile electronics, keys oftentimes are operatively connected with metal or carbon coated poly domes that act as switches for the keys and that are elastically collapsible and provide tactile feedback to a user when the domes are collapsed from a relaxed position to a deflected position. The simultaneous pressing of multiple keys to provide a given function thus oftentimes can result in the collapsing of multiple domes, which can result in a confusing and/or undesirable tactile feedback to a user. Other attempts at improving usability have involved decreasing the quantity of keys on a handheld device while increasing the number of functions each key is to serve. Such systems potentially can become cumbersome because the various functions of a given key may additionally require the pressing of a SHIFT key, an ALT key, or another key to provide the various functions. In such a circumstance, the required multiple key pushing requires multiple hand movements which can interfere with user friendliness.

SUMMARY OF THE INVENTION

An improved handheld electronic device, keypad, and method in accordance with the invention meet these and other needs. An improved handheld electronic device having an improved keypad provides enhanced usability and reduced size by organizing its keys in pairs, with a pair of keys being disposed on a support. Each key of a pair of keys is individually actuatable. An actuation of a key causes a primary conductor associated with the key set to electrically to connect a pair of contacts and to cause a secondary conductor associated with the key to electrically connect another pair of contacts. The primary conductor is a dome that is collapsible to electrically connect the pair of contacts and to provide a particular tactile feedback to the user. The secondary conductor is a conductor other than a collapsible dome. An actuation of any key or of any pair of keys thus provides to the user a consistent tactile feedback from a collapse of a single dome. An improved method in accordance with the invention is also disclosed.

Accordingly, an aspect of the invention is to provide an improved handheld electronic device, an improved keypad, and an improved method that provide enhanced usability.

Another aspect of the invention is to provide an improved handheld electronic device and an improved keypad having keys that are organized in pairs to enable the keypad to have a reduced overall size.

Another aspect of the invention is to provide an improved handheld electronic device and an improved keypad that provide both collapsible domes (or alternative switches providing tactile feedback) and conductive carbon elements (or alternative switches generally not providing tactile feedback), with a collapsing of a dome providing a tactile feedback to the user.

Another aspect of the invention is to provide an improved method of enabling input into a handheld electronic device wherein keys of the handheld electronic device have linguistic elements assigned thereto and wherein pairs of keys also have linguistic elements assigned thereto, with the improved method providing a plurality of modes for detecting input from the keys.

Another aspect of the invention is to provide an improved handheld device and an improved keypad that enables a small form factor while still providing enhanced usability or user friendliness.

Accordingly, an aspect of the invention is to provide an improved keypad that is structured to be incorporated into a handheld electronic device. The general nature of the keypad can be stated as including a contact apparatus, a button apparatus, a primary conductor portion, and a secondary conductor portion. The contact apparatus includes a plurality of electrical contacts. The button apparatus includes a number of key sets. Each key set of at least a portion of the number of key sets includes a pair of keys and a support, with the pair of keys being disposed on the support. The primary conductor portion includes a number of primary conductors that are elastically deflectable between a relaxed position and a deflected position. Each primary conductor of at least a portion of the number of primary conductors in the deflected position electrically connects together a pair of electrical contacts of the plurality of electrical contacts. The secondary conductor portion includes a number of secondary conductors that are movable between a first position and a second position. Each secondary conductor of at least a portion of the number of secondary conductors in the second position electrically connects together a pair of electrical contacts of the plurality of electrical contacts. The pair of keys includes a first key and a second key, with the first key being movable between an unactuated position and an actuated position, and with the second key being movable between an unactuated position and an actuated position. A primary conductor which corresponds with the key set is in the deflected position when the first key is in the actuated position. A first secondary conductor which corresponds with the first key is in the second position when the first key is in the actuated position. The primary conductor which corresponds with the key set is in the deflected position when the second key is in the actuated position. A second secondary conductor which corresponds with the second key is in the second position when the second key is in the actuated position.

Another aspect of the invention is to provide an improved handheld electronic device, the general nature of which can be stated as including a processor apparatus, an input apparatus, and an output apparatus. The processor apparatus includes a processor and a memory. The input apparatus includes a keypad and is cooperable with the processor apparatus to provide input to the processor apparatus. The output apparatus is cooperable with the processor apparatus to receive signals from the processor apparatus and to provide output. The keypad includes a contact apparatus, a button apparatus, a primary conductor portion, and a secondary conductor portion. The contact apparatus includes a plurality of electrical contacts. The button apparatus includes a number of key sets. Each key set of at least a portion of the number of key sets includes a pair of keys and a support, with the pair of keys being disposed on the support. The primary conductor portion includes a number of primary conductors that are elastically deflectable between a relaxed position and a deflected position. Each primary conductor of at least a portion of the number of primary conductors in the deflected position electrically connects together a pair of electrical contacts of the plurality of electrical contacts. The secondary conductor portion includes a number of secondary conductors that are movable between a first position and a second position. Each secondary conductor of at least a portion of the number of secondary conductors in the second position electrically connects together a pair of electrical contacts of the plurality of electrical contacts. The pair of keys includes a first key and a second key, with the first key being movable between an unactuated position and an actuated position, and with the second key being movable between an unactuated position and an actuated position. A primary conductor which corresponds with the key set is in the deflected position when the first key is in the actuated position. A first secondary conductor which corresponds with the first key is in the second position when the first key is in the actuated position. The primary conductor which corresponds with the key set is in the deflected position when the second key is in the actuated position. A second secondary conductor which corresponds with the second key is in the second position when the second key is in the actuated position.

Another aspect of the invention is to provide an improved method of enabling input into a handheld electronic device. The handheld electronic device is of a type that includes an input apparatus having a pair of keys, with the pair of keys including a first key having a first linguistic element assigned thereto and a second key having a second linguistic element assigned thereto, and with the pair of keys having a third linguistic element assigned thereto. The handheld electronic device is operable in at least a first input mode and a second input mode. The general nature of the method can be stated as including detecting in the first input mode at least one of i) an actuation of the first key as being an input of the first linguistic element; and ii) an actuation of the second key as being an input of the second linguistic element. The method further includes detecting in the second input mode an actuation of the first key as being an input of the third linguistic element and an actuation of the second key as being an input of the third linguistic element.

BRIEF DESCRIPTION OF THE DRAWINGS

A full understanding of the invention can be gained from the following Description of the Preferred Embodiment when read in conjunction with the accompanying drawings in which:

FIG. 4 is a sectional view as taken along line 4-4 of FIG. 2;

Similar numerals refer to similar parts throughout the specification.

DESCRIPTION OF THE PREFERRED EMBODIMENT

Figure 1:
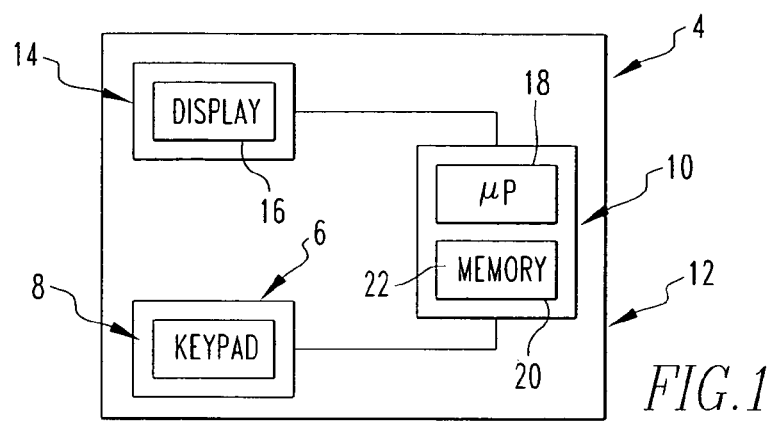
FIG. 1 is a block diagram of an improved handheld electronic device in accordance with the invention.
Figure 3:
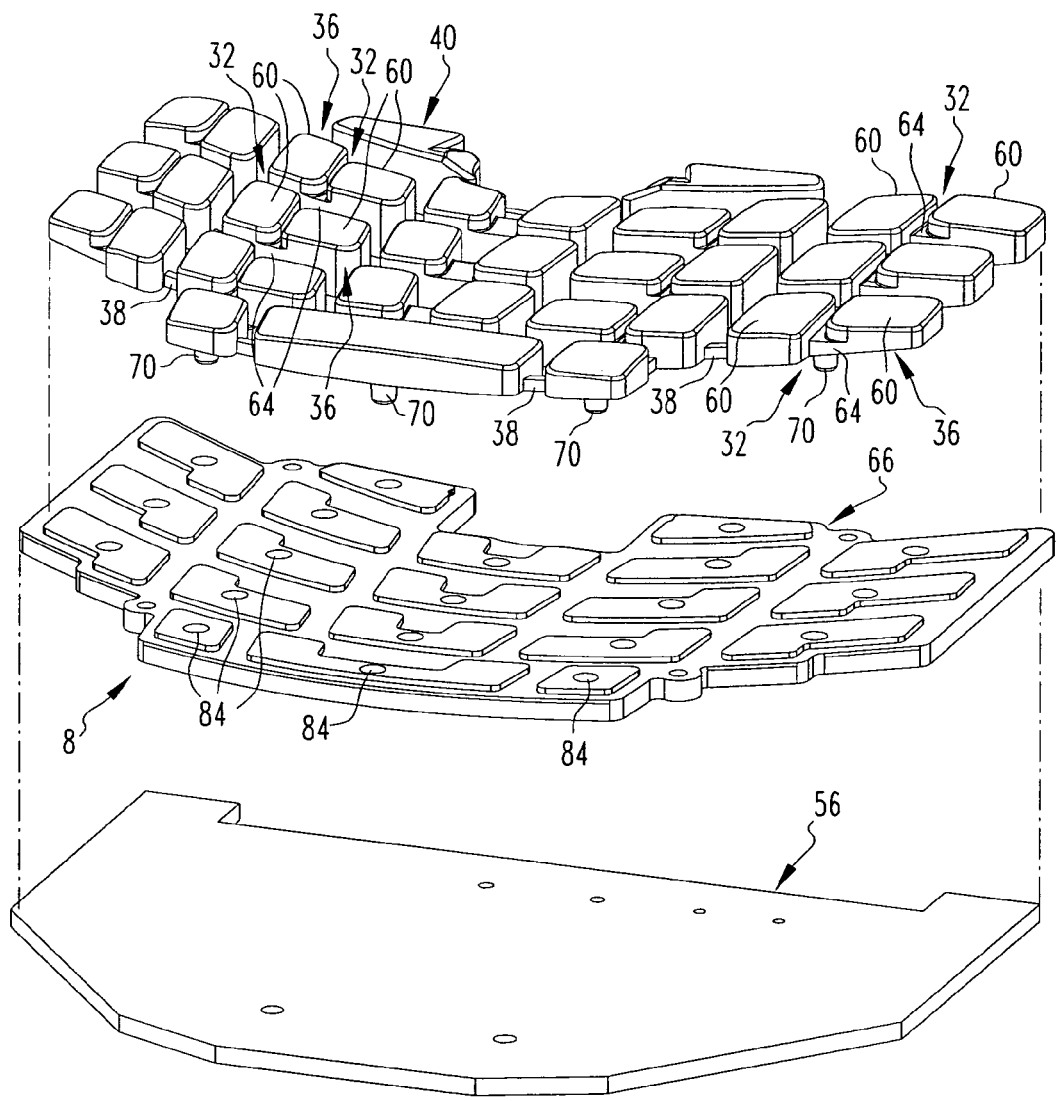
FIG. 3 is an exploded perspective view of the keypad of FIG. 2.

An improved handheld electronic device 4 in accordance with the invention is depicted schematically in FIG. 1. The handheld electronic device 4 includes an improved keypad 8 in accordance with the invention that is depicted, in whole or in part, in FIGS. 2-8. The handheld electronic device 4 and the keypad 8 advantageously are configured to be of a relatively small size while providing enhanced usability, for example, in accordance with an improved method in accordance with the invention, as will be set forth more fully below.

The handheld electronic device 4 includes an input apparatus 6, a processor apparatus 10, a housing 12, and an output apparatus 14. The input apparatus 6 includes the keypad 8. The output apparatus 14 includes a display 16. The keypad 8 and the display 16 are disposed on the housing 12.

The processor apparatus 10 includes a suitable processor 18 such as, without limitation, a microprocessor (μP). The processor apparatus 10 further includes a memory 20 having a number of routines 22 stored therein that are executable on the processor 18. The routines 22 executed on the processor 18 provide functionality to inputs received from the keypad 8 and provide outputs to the display 16. The memory 20 can be any of a variety of storage devices and may include one or more of, for example and without limitation. RAM, ROM, EPROM, EEPROM, and/or other appropriate storage device. Examples of handheld electronic devices are included in U.S. Pat. Nos. 6,452,588 and 6,489,950, which are incorporated by reference herein.

Figure 2:
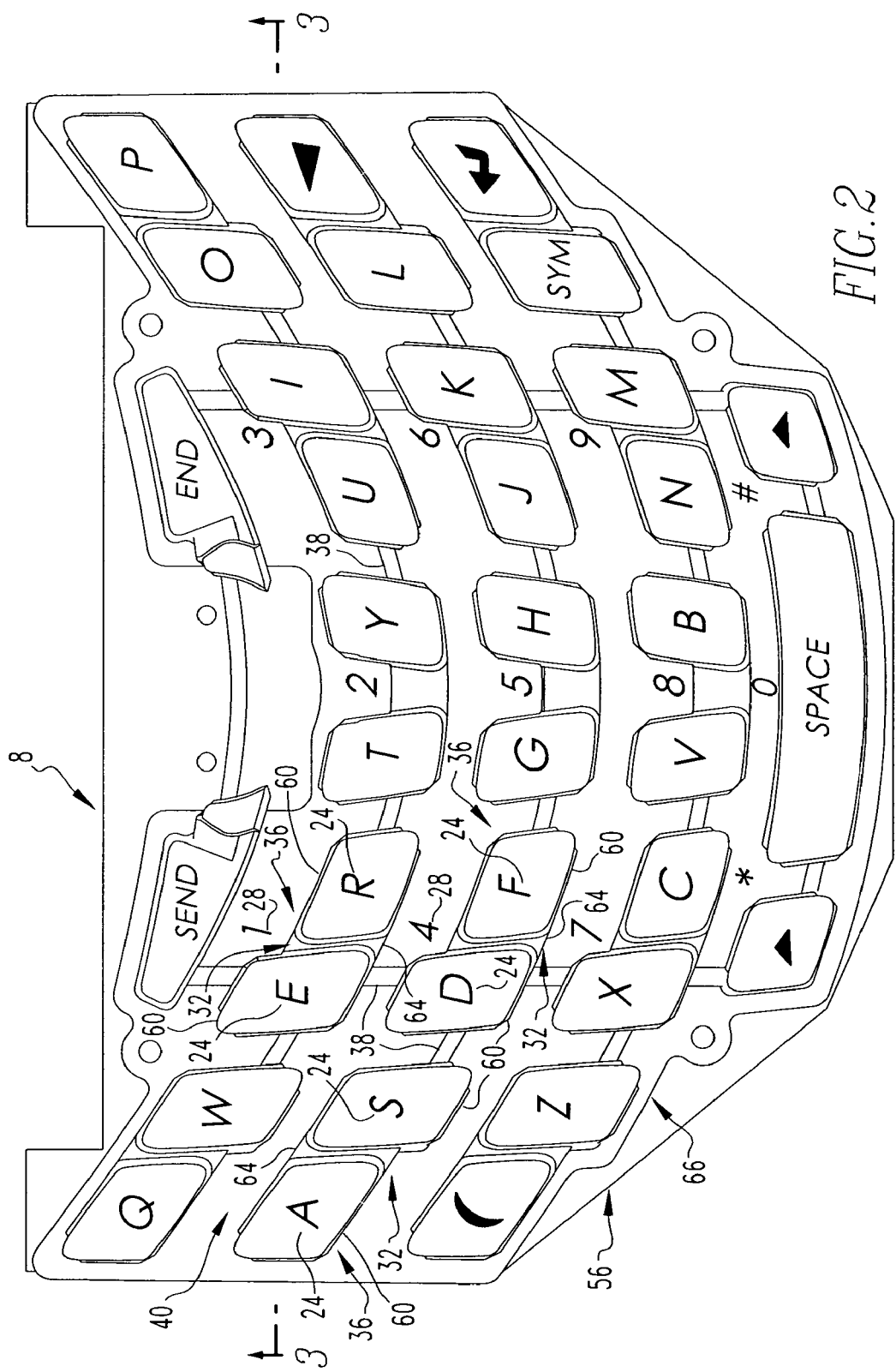
FIG. 2 is a top plan view of an improved keypad in accordance with the invention.

As can be seen in FIG. 2, the exemplary keypad 8 includes a plurality of keys 60. Many of the keys 60 have a linguistic element 24 assigned thereto. As employed herein, the expression "linguistic element" and variations thereof shall refer broadly to any type of character, ideogram, numerical reference, and/or other symbol that can be employed to provide linguistic expression, and can expressly include portions of the same such as strokes and the like without limitation. Many of the keys 60 are organized in pairs 32 of keys 60. A pair 32 of adjacent keys 60 can have an alternate linguistic element 28 assigned thereto. As will be set forth in greater detail below, the handheld electronic device 4 and the method of the invention allow input in a plurality of input modes. Depending upon which input mode is active on the handheld electronic device 4, an actuation of a key 60 can cause an input of the linguistic element 24 assigned to the actuated key 60 or can cause an input of the alternate linguistic element 28 assigned to the key 60 and to the key 60 adjacent thereto which form a pair 32.

As can be understood from FIGS. 3-4 and 6-8, the keypad 8 includes a button apparatus 40, a primary conductor portion 44 (FIGS. 6-8), a secondary conductor portion 48 (FIGS. 4 and 6-8), and a contact apparatus in the form of a printed circuit board 56. It is noted that the primary conductor portion is not expressly depicted in FIG. 3 for purposes of clarity. The button apparatus 40 includes a number of key sets 36, a number of bridging members 38 extending between some of the key sets 36, and a flexible mount 66. As employed herein, the expression of "a number of" and variations thereof shall refer broadly to any nonzero quantity, including a quantity of one.

The key sets 36 each generally include a pair 32 of the keys 60, a support 64, and an actuator 70. In the exemplary embodiment depicted herein, the support 64 is disposed between the keys 60 of the pair 32, and the actuator 70 is disposed generally adjacent the support 64. A small gap 42 is provided between the keys 60 adjacent the support 64, i.e., the support 64 terminates at the gap 42. The gap 42 provides a small space 120 between the keys 60 of the key set 36 to provide to the user a visual and tactile differentiation between the two adjacent keys 60. The support 64 serves to connect together the keys 60 of a pair of keys 32.

The flexible mount 66 is disposed generally between the keys 60 and the printed circuit board 56. The exemplary mount 66 depicted herein includes a plurality of downwardly-depending legs 46 that are engageable with the printed circuit board 56.

The actuators 70 in the present exemplary embodiment are formed on the supports 64 and may extend across at least a portion of one or more of the keys 60 of the key set 36. In the present exemplary embodiment, the actuators 70 extend through openings 84 formed in the flexible mount 66. It is noted that in other embodiments the actuators 70 may be formed as a part of the flexible mount 66 without departing from the concept of the invention. The exemplary flexible mount 66 is formed of a flexible silicone compound but could be made of other materials without departing from the concept of the invention.

The primary conductor portion 44 (FIGS. 6-8) includes a plurality of conductive domes 68 which, in the present exemplary embodiment, are disposed on the printed circuit board 56. The domes 68 are elastically deflectable between a relaxed position, i.e., FIG. 6, and a deflected position, i.e., FIGS. 7-8. The movement of the domes 68 between the relaxed and deflected positions occurs via elastic deformation of the domes 68 and causes the domes to "snap" between the relaxed and deflected positions to provide a desirable tactile feedback to the user.

Figure 5:
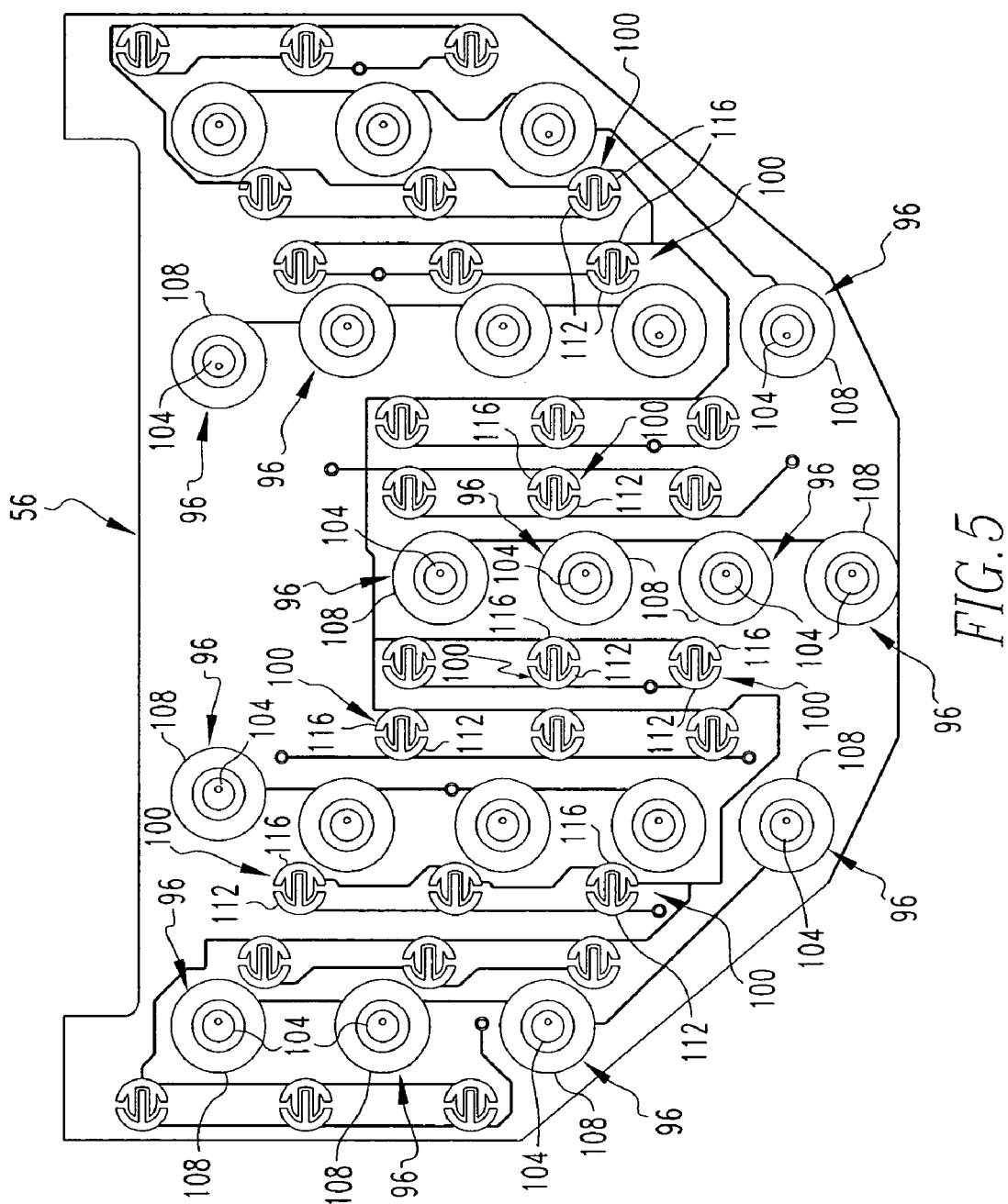
FIG. 5 is a top plan view of a printed circuit board of the keypad of FIG. 2.

The domes 68 in the deflected position connect together a set of primary contacts 96, such as are depicted in FIG. 5, to complete an electrical circuit therebetween. The exemplary sets of primary contacts 96 each include a ball contact 104 and a ring contact 108 that are concentrically disposed on the printed circuit board 56. When a dome 68 is in the relaxed position, its circular edge, i.e., the portion of the dome 68 opposite the proud portion thereof, is disposed on the ring contact 108 of the associated set of primary contacts 96. When the dome 68 is in the deflected position, its previously proud portion engages the ball contact 98 of the associated pair of primary contacts 96 to complete an electrical circuit therebetween to provide an input that can be detected by the processor 18. The domes 68 may be made in whole or in part of metal or another electrical conductor.

The secondary conductor portion 48 includes a plurality of carbon pills 76 which, in the present exemplary embodiment, are disposed on the flexible mount 66. The carbon pills 76 are small members that are formed of or are coated with an electrically conductive carbon material. The carbon pills 76 can be, for instance, adhered or otherwise mounted to the flexible mount 66. Similarly, the flexible mount 66 could be formed, i.e., cured, in physical contact with the carbon pills 76, whereby the flexible mount 66 could be formed to the carbon pills 76 to retain the carbon pills 76 thereon. Other configurations are possible. It is also noted that the carbon pills 76 could be disposed on the keys 60 themselves without departing from the concept of the invention.

Figure 6:
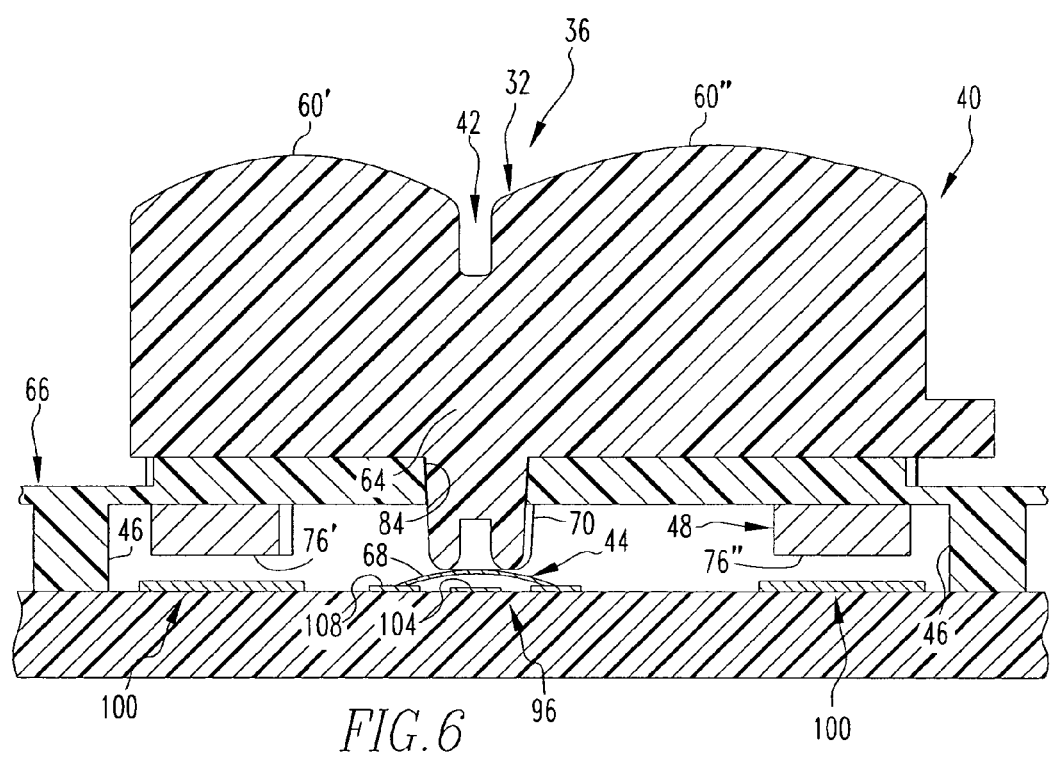
FIG. 6 is an enlarged view of a portion of FIG. 4 and depicts each of a first key and a second key of a pair of keys in an unactuated position.
Figure 7:
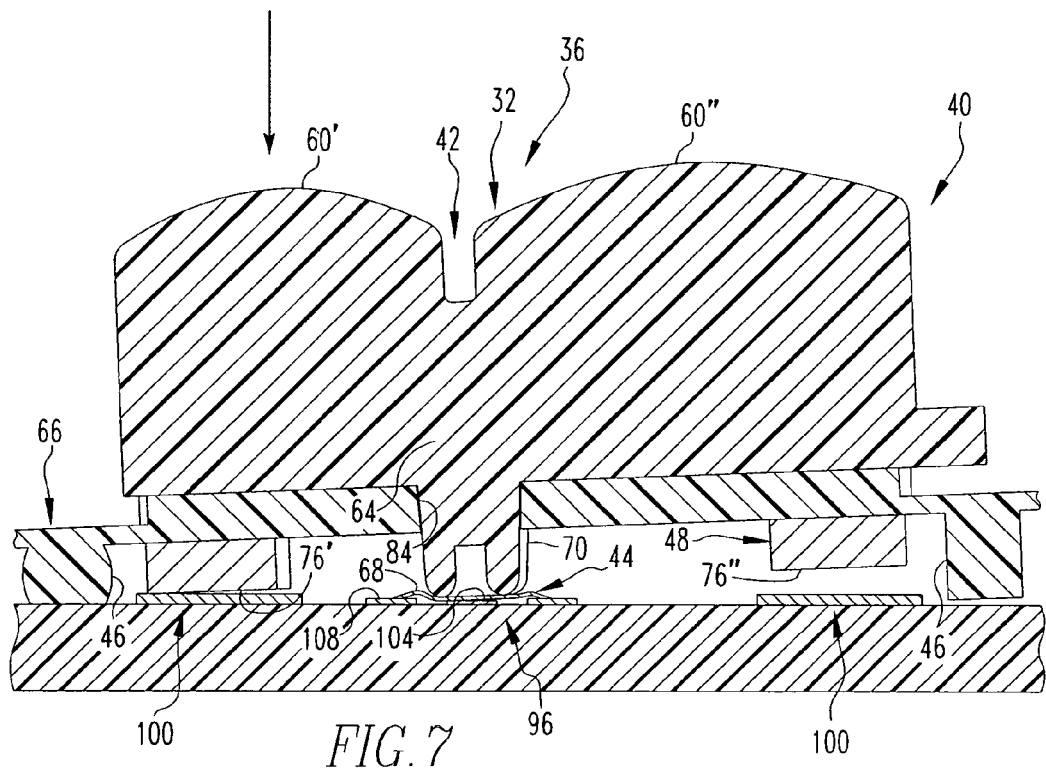
FIG. 7 is a view similar to FIG. 6, except depicting the first key in an actuated position.
Figure 8:
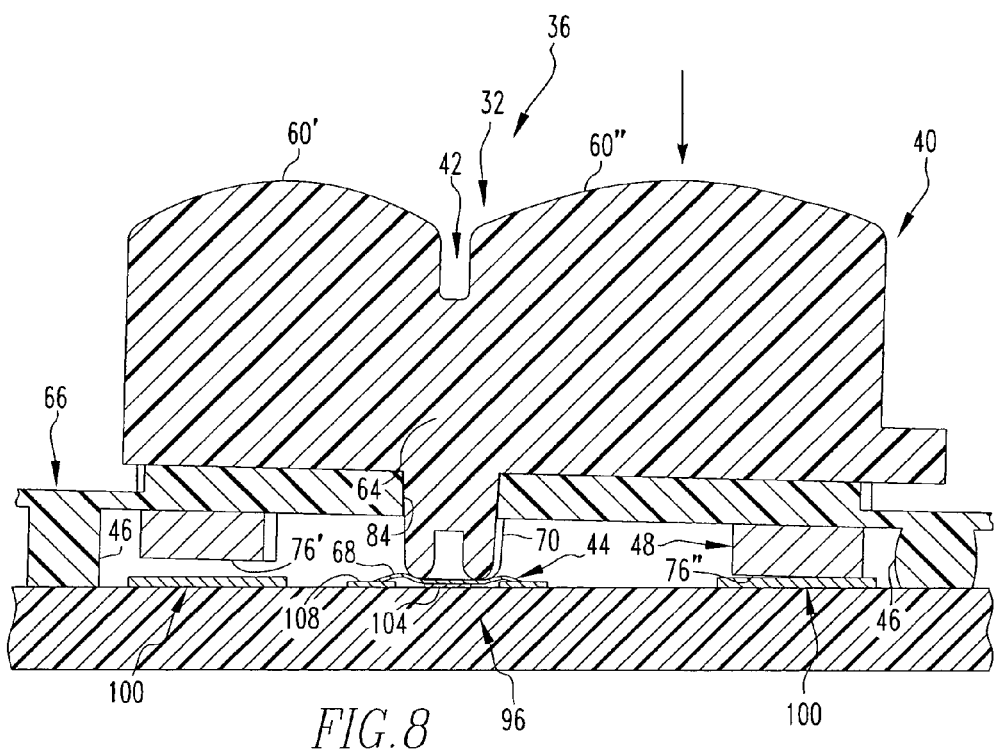
FIG. 8 is a view similar to FIG. 6, except depicting the second key in an actuated position.

Each carbon pill 76 is movable between a first position, i.e., FIG. 6, and a second position, as is variously depicted in FIGS. 7-8. In the second position, a carbon pill 76 electrically connects together an associated set of secondary contacts 100, such as are depicted generally in FIG. 5. The sets of secondary contacts 100 are of an "intermeshed comb" configuration that includes a first comb contact 112 and a second comb contact 116 having a number of fingers that are adjacent or are intermeshed. When a carbon pill 76 engages a set of secondary contacts 100, it completes an electrical circuit between the first comb contact 112 and the second comb contact 116 to provide an input that can be detected by the processor 18.

It is understood that the domes 68 and the carbon pills 76 can be said to serve as switches for the keys 60. The domes provide a tactile feedback in being elastically deformed between the relaxed and deflected positions. The carbon pills 76 moving between the first and second positions to engage the secondary contacts 100 generally do not provide any tactile feedback apart from the resistance provided by elastic deformation of the flexible mount 66 which, in any event, is not the same as the tactile feedback provided by the domes 68.

Each key 60 has an associated carbon pill 76 that is associated therewith and that is moved between its first and second positions when the key 60 is actuated. Each key set 36 has an associated dome 68 associated therewith that is elastically deflectable between the relaxed and deflected positions upon an actuation of a key 60 of the aforementioned key set 36. Each key 60 of a key set 36 thus also has associated therewith the same associated dome 68.

An exemplary embodiment of a key set 36 having a pair 32 of keys 60 is depicted in FIGS. 6-8. The pair 32 of keys 60 includes a first key 60', a second key 60", and a support 64 25 disposed therebetween. The key set 36 also includes an associated actuator 70 that can be said to be associated with the support 64 and the keys 60' and 60" and that is engaged with the proud portion of an associated dome 68. A first carbon pill 76' is associated with first key 60', and a second carbon pills 76" is associated with the second key 60". In FIG. 6, the first and second keys 60' and 60" are each in an unactuated position, whereby the dome 68 is in the relaxed position and the first and second carbon pills 76' and 76" are each in the first position.

In FIG. 7, the first key 60' has been actuated and thus has been moved from its unactuated position to an actuated position. When the first key 60' is in the actuated position, the dome 68 has been elastically deformed by the actuator 70 to the deflected position, thereby providing to the user the tactile feedback associated with such movement of the dome 68. Actuation of the first key 60' also elastically deflects or flexes the mount 66 which moves the first carbon pill 76' from the first position to the second position. As such, the dome 68 has electrically connected together the associated set of primary contacts 96, and the first carbon pill 76' has electrically connected together the associated set of secondary contacts 100. The completion of a circuit that includes the aforementioned set of primary contacts 96 and the completion of the circuit that includes the aforementioned set of secondary contacts 100 each provide an input that can be detected by the processor 18. Upon releasing the first key 60', the elastic energy stored in the dome 68 in the deflected position and the mount 66 in the flexed condition cause the first key 60' to rebound to its unactuated position, as is depicted generally in FIG. 6.

In FIG. 8, the second key 60" is depicted as having been actuated from its unactuated position to an actuated position. The dome 68 is in the deflected position, and the second carbon pill 76" is in a second position where it electrically connects together another set of secondary contacts 100.

In actuating the first key 60' or the second key 60", the support 64 pivots slightly and is translated slightly toward the printed circuit board 56, the dome 68 moves between the relaxed position and the deflected position, and either the first carbon pill 76' or second carbon pill 76" is moved from its first position to its second position. Despite the first and second keys 60' and 60" each being disposed on a common support 64, the first and second keys 60' and 60" can be actuated independently of one another.

By arranging the keys 60 in the pairs 32, the keypad 68 can advantageously have an overall size that is relatively smaller than other keypads. In this regard, it can be seen that the keys 60 of any pair 32 have the space 120 therebetween that is of a certain width, such as might be measured in the horizontal plane from the perspective of FIG. 4. A given key set 36 is spaced from an adjacent key set 36 by what may be called a pitch space 124 therebetween, such as might be measured in the same plane as the space 120. It can be seen that at least some of the spaces 120 are relatively smaller than at least some of the pitch spaces 124. The keys 60 in any given pair 32 are, however, clearly spaced apart from one another and thus are individually identifiable by a user. The tighter spacing between certain of the keys 60, i.e., between the keys 60 in any given pair 32, than between other keys 60, i.e., a key 60 from a given pair 32 and an adjacent key 60 in an adjacent pair 32, enables the keypad 8 to have an overall relatively smaller configuration than if all of the keys 60 were spaced the same distance apart. In the present exemplary embodiment, the differential size between the space 120 and the pitch space 124 allows the keypad 8 to be relatively narrow, as can be measured in a plane corresponding with the horizontal direction in FIG. 4. Other arrangements of the keys 60 could provide relatively smaller overall dimensions in other directions in a fashion that would be within the scope of the invention.

In accordance with an aspect of the invention, the routines 22 include an input routine that provides to the handheld electronic device 4 a plurality of input modes. The input modes could be, for example and without limitation, a text input mode, a telephone mode, a numeric mode, and/or other input mode. An actuation of any given key 60 could provide an input to the processor 18 that could be detected by the processor 18 as being a number of different inputs depending upon which of the input modes is currently active on the handheld electronic device 4. In the exemplary keypad 8 depicted generally in FIG. 2, many of the keys 60 have assigned thereto a linguistic element 24 which, in the present example, may be a Roman letter. Moreover, many of the pairs 32 of keys 60 have assigned thereto an alternate linguistic element 28 in the form of, for example, an Arabic numeral, i.e., a digit. The alternate linguistic elements 28 are arranged on the keypad 8 in the form of a touch-tone keypad that additionally provides an asterisk, i.e., *, assigned to one of the keys 60 and a number symbol or pound sign, i.e., #, assigned to another key 60 at locations corresponding with those of a conventional touch-tone layout.

If, for example, the text input mode is active on the handheld electronic device 4, an actuation of a key 60 having a linguistic element 24 assigned thereto such as in the nature of a Roman letter will result in an input to the processor 18 that is detected by the processor 18 as being the linguistic element 24. On the other hand, if the telephone input mode or the numeric input mode, for example and without limitation, is active on the handheld electronic device 4, an actuation of a key 60 that is part of a pair 32 having assigned thereto an alternate linguistic element 28 in the form of, for example, an Arabic numeral will provide an input to the processor 18 that is detected by the processor 18 as being the alternate linguistic element 28. Such a detection will occur despite the actuated key 60 itself also having assigned thereto a linguistic element 24 in the nature of a Roman letter. When the handheld electronic device 4 is in the telephone input mode or the numeric input mode, for example and without limitation, an actuation of either or both of the keys 60 in any given pair 32 to which an alternate linguistic element 28 has been assigned will result in an input to the processor 18 that is detected by the processor 18 as being the alternate linguistic element 28. It is understood that other types of input modes can be employed and/or other types of linguistic elements can be assigned to the keys 60 and/or the pairs 32 without departing from the concept of the invention.

The handheld electronic device 4 thus advantageously is configured to be of a relatively small size and to have enhanced functionality that is provided, for example, by the method of the invention. The method of the invention provides enhanced functionality by, in addition to allowing an input of a linguistic element 24 assigned to a key 60 by actuating the key 60, also providing for the entry of alternate linguistic elements 28 that are assigned to pairs 32 of the keys 60. When an input mode of the type that detects actuations of keys 60 as being inputs of such alternate linguistic elements 28 is active on the handheld electronic device 4, an actuation of either of the keys 60 of a given pair 32 will result in an input of the alternate linguistic element 28 assigned to the pair 32. As such, a user desiring to enter such an alternate linguistic element 28 can press either or both of the keys 60 in the pair 32, which facilitates rapid entry of such inputs. Such entry can be rapid because, for instance, the user can press either or both of such keys 60 without a concern of specifically pressing one key 60 or the other key 60. This advantageously also allows a user to pay relatively less attention when providing certain inputs than would be the case if the user were required to actuate only a particular key 60. Moreover, regardless of which key 60 of a pair 32 a user actuates, or if a user actuates both keys 60 simultaneously, the user will receive a desirable and consistent tactile feedback in the nature of a collapse of a single dome 68.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A keypad structured to be incorporated into a handheld electronic device, the keypad comprising:
   a contact apparatus comprising a plurality of electrical contacts;
   a button apparatus comprising a number of key sets, each key set of at least a portion of the number of key sets comprising a pair of keys and a support, the pair of keys being disposed on the support;
   a primary conductor portion comprising a number of primary conductors that are elastically deflectable between a relaxed position and a deflected position, each primary conductor of at least a portion of the number of primary conductors in the deflected position electrically connecting together a pair of electrical contacts of the plurality of electrical contacts;
   a secondary conductor portion comprising a number of secondary conductors that are movable between a first position and a second position, each secondary conductor of at least a portion of the number of secondary conductors in the second position electrically connecting together a pair of electrical contacts of the plurality of electrical contacts;
   the pair of keys comprising a first key and a second key, the first key being movable between an unactuated position and an actuated position, the second key being movable between an unactuated position and an actuated position;
   a primary conductor of the number of primary conductors which corresponds with the key set being in the deflected position when the first key is in the actuated position;
   a first secondary conductor of the at least a portion of the number of secondary conductors which corresponds with the first key being in the second position when the first key is in the actuated position;
   the primary conductor which corresponds with the key set being in the deflected position when the second key is in the actuated position; and
   a second secondary conductor of the at least a portion of the number of secondary conductors which corresponds with the second key being in the second position when the second key is in the actuated position.

2. The keypad of claim 1 wherein the contact apparatus includes a printed circuit board, wherein the primary conductors and the secondary conductors are disposed generally between the printed circuit board and the keys, and wherein the support of a key set is disposed generally between the pair of keys of the key set.

3. The keypad of claim 1 wherein the secondary conductors are conductive carbon elements movable by the key sets into conductive contact with the electrical contacts.

4. The keypad of claim 3 wherein the button apparatus includes a flexible mount, at least a portion of the key sets of the number of key sets being disposed on the mount, and at least a portion of the secondary conductors of the number of secondary conductors being disposed on the mount, the mount being structured to be flexed when at least one of a first key and a second key of a key set of the at least a portion of the key sets is actuated.

5. The keypad of claim 1 wherein the first key has a first linguistic element assigned thereto, wherein the second key has a second linguistic element assigned thereto, and wherein the key set has a third linguistic element assigned thereto.

6. The keypad of claim 1 wherein a key set of the number of key sets is disposed adjacent another key set of the number of key sets, the another key set comprising another support and another pair of keys comprising another first key and another second key, the support between the first key and the second key providing a space between the first key and the second key, the another support between the another first key and the another second key providing another space between the another first key and the another second key, the key set and the another key set having a pitch space therebetween, the space and the another space being smaller than the pitch space.

7. The keypad of claim 1 wherein the button apparatus includes a number of actuators, each key set of at least a portion of the number of key sets having associated therewith an associated actuator of the number of actuators which extends away from the key set in a direction generally toward the contact apparatus and which is engageable with an associated primary conductor of the number of primary conductors to move the associated primary conductor between the relaxed position and the deflected position.

8. The keypad of claim 7 wherein the button apparatus includes a flexible mount disposed generally between the contact apparatus and at least a portion of the key sets of the number of key sets, and wherein at least a portion of the associated actuators are each one of a protrusion formed on the flexible mount and a protrusion that is formed on a key set of the number of key sets and that extends through an opening formed in the flexible mount.

9. The keypad of claim 7 wherein at least a portion of the associated actuators are each disposed generally adjacent the support of the key set.

10. The keypad of claim 1 wherein the first secondary conductor is disposed generally between the first key and the contact apparatus, and wherein the second secondary conductor is disposed generally between the second key and the contact apparatus.

11. A handheld electronic device comprising:
   a processor apparatus comprising a processor and a memory;
   an input apparatus comprising a keypad, the input apparatus being cooperable with the processor apparatus to provide input to the processor apparatus; and
   an output apparatus cooperable with the processor apparatus to receive signals from the processor apparatus and to provide output;
   the keypad comprising a contact apparatus, a button apparatus, a primary conductor portion, and a secondary conductor portion;
   the a contact apparatus comprising a plurality of electrical contacts;
   the button apparatus comprising a number of key sets, each key set of at least a portion of the number of key sets comprising a pair of keys and a support, the pair of keys being disposed on the support;
   the primary conductor portion comprising a number of primary conductors that are elastically deflectable between a relaxed position and a deflected position, each primary conductor of at least a portion of the number of primary conductors in the deflected position electrically connecting together a pair of electrical contacts of the plurality of electrical contacts;

the secondary conductor portion comprising a number of secondary conductors that are movable between a first position and a second position, each secondary conductor of at least a portion of the number of secondary conductors in the second position electrically connecting together a pair of electrical contacts of the plurality of electrical contacts;

the pair of keys comprising a first key and a second key, the first key being movable between an unactuated position and an actuated position, the second key being movable between an unactuated position and an actuated position;

a primary conductor of the number of primary conductors which corresponds with the key set being in the deflected position when the first key is in the actuated position;

a first secondary conductor of the at least a portion of the number of secondary conductors which corresponds with the first key being in the second position when the first key is in the actuated position;

the primary conductor which corresponds with the key set being in the deflected position when the second key is in the actuated position; and a second secondary conductor of the at least a portion of the number of secondary conductors which corresponds with the second key being in the second position when the second key is in the actuated position.

12. The handheld electronic device of claim 11 wherein the contact apparatus includes a printed circuit board, wherein the primary conductors and the secondary conductors are disposed generally between the printed circuit board and the keys, and wherein the support of a key set is disposed generally between the pair of keys of the key set.

13. The handheld electronic device of claim 11 wherein the secondary conductors are conductive carbon elements movable by the key sets into conductive contact with the electrical contacts.

14. The handheld electronic device of claim 13 wherein the button apparatus includes a flexible mount, at least a portion of the key sets of the number of key sets being disposed on the mount, and at least a portion of the secondary conductors of the number of secondary conductors being disposed on the mount, the mount being structured to be flexed when at least one of a first key and a second key of a key set of the at least a portion of the key sets is actuated.

15. The handheld electronic device of claim 11 wherein the first key has a first linguistic element assigned thereto, wherein the second key has a second linguistic element assigned thereto, and wherein the key set has a third linguistic element assigned thereto.

16. The handheld electronic device of claim 15 wherein the memory includes a number of routines stored therein, at least one of the routines being executable on the processor to provide to the processor a plurality of input modes, the plurality of input modes including a first input mode and a second input mode, the processor in the first input mode being adapted to detect an actuation of the first key as an input of the first linguistic element and to detect an actuation of the second key as an input of the second linguistic element, the processor in the second input mode being adapted to detect an actuation of the first key as an input of the third linguistic element and to detect an actuation of the second key as an input of the third linguistic element.

17. The handheld electronic device of claim 11 wherein a key set of the number of key sets is disposed adjacent another key set of the number of key sets, the another key set comprising another support and another pair of keys comprising another first key and another second key, the support between the first key and the second key providing a space between the first key and the second key, the another support between the another first key and the another second key providing another space between the another first key and the another second key, the key set and the another key set having a pitch space therebetween, the space and the another space being smaller than the pitch space.

18. The handheld electronic device of claim 11 wherein the button apparatus includes a number of actuators, each key set of at least a portion of the number of key sets having associated therewith an associated actuator of the number of actuators which extends away from the key set in a direction generally toward the contact apparatus and which is engageable with an associated primary conductor of the number of primary conductors to move the associated primary conductor between the relaxed position and the deflected position.

19. The handheld electronic device of claim 18 wherein the button apparatus includes a flexible mount disposed generally between the contact apparatus and at least a portion of the key sets of the number of key sets, and wherein at least a portion of the associated actuators are each one of a protrusion formed on the flexible mount and a protrusion that is formed on a key set of the number of key sets and that extends through an opening formed in the flexible mount.

20. The handheld electronic device of claim 18 wherein at least a portion of the associated actuators are each disposed generally adjacent the support of the key set.

21. The handheld electronic device of claim 11 wherein the first secondary conductor is disposed generally between the first key and the contact apparatus, and wherein the second secondary conductor is disposed generally between the second key and the contact apparatus.

22. A method of enabling input into a handheld electronic device of a type that includes an input apparatus having a pair of keys, the pair of keys including a first key having a first linguistic element assigned thereto and a second key having a second linguistic element assigned thereto, the pair of keys having a third linguistic element assigned thereto, the handheld electronic device being operable in at least a first input mode and a second input mode, the method comprising:

detecting in the first input mode at least one of:
an actuation of the first key as being an input of the first linguistic element; and
an actuation of the second key as being an input of the second linguistic element; and detecting in the second input mode an actuation of the first key as being an input of the third linguistic element and an actuation of the second key as being an input of the third linguistic element.

23. The method of claim 22 wherein said detecting in the first input mode includes detecting in a text mode, and wherein said detecting in the second input mode includes at least one of detecting in a telephone mode and detecting in a numeric mode.

* * * * *

UNITED STATES PATENT AND TRADEMARK OFFICE
CERTIFICATE OF CORRECTION

PATENT NO. : 7,388,576 B2  
APPLICATION NO. : 11/063682  
DATED : June 17, 2008  
INVENTOR(S) : Jason T. Griffin et al.

Page 1 of 1

It is certified that error appears in the above-identified patent and that said Letters Patent is hereby corrected as shown below:

Column 6, line 58, "64 25 disposed therebetween" should be --64 disposed therebetween--.
Column 7, line 33, "second keys 60" and 60" each" should be --second keys 60' and 60" each--.

Signed and Sealed this

Seventeenth Day of February, 2009

JOHN DOLL  
*Acting Director of the United States Patent and Trademark Office*